US012554732B2

(12) United States Patent
Lim (10) Patent No.: US 12,554,732 B2
(45) Date of Patent: Feb. 17, 2026

(54) METHOD OF PROPOSING SOLUTION, BASED ON SURVEY

(71) Applicants: SEOUL NATIONAL UNIVERSITY HOSPITAL, Seoul (KR); HEALTHCONNECT Co., Ltd., Seoul (KR)

(72) Inventor: Ju Won Lim, Seoul (KR)

(73) Assignees: SEOUL NATIONAL UNIVERSITY HOSPITAL, Seoul (KR); HEALTHCONNECT Co., Ltd., Seoul (KR)

( * ) Notice: Subject to any disclaimer, the term of this patent is extended or adjusted under 35 U.S.C. 154(b) by 0 days.

(21) Appl. No.: 18/645,746

(22) Filed: Apr. 25, 2024

(65) Prior Publication Data

US 2024/0362242 A1  Oct. 31, 2024

(30) Foreign Application Priority Data

Apr. 25, 2023  (KR) .................. 10-2023-0054136

(51) Int. Cl.
 *G06F 16/248* (2019.01)
 *G06F 16/25* (2019.01)
(52) U.S. Cl.
 CPC .......... *G06F 16/248* (2019.01); *G06F 16/258* (2019.01)
(58) Field of Classification Search
 None
 See application file for complete search history.

(56) References Cited

U.S. PATENT DOCUMENTS

| | | | |
|---|---|---|---|
| 8,429,179 B1* | 4/2013 | Mirhaji | G06F 16/9024 707/756 |
| 2010/0036614 A1* | 2/2010 | Zuercher | G01V 1/288 703/10 |

(Continued)

FOREIGN PATENT DOCUMENTS

| | | |
|---|---|---|
| KR | 1020130062414 A | 6/2013 |
| KR | 1020160043777 A | 4/2016 |

(Continued)

OTHER PUBLICATIONS

A review with Illustrations and suggested solutions for best practice (Year: 2013).*

(Continued)

*Primary Examiner* — Kim T Nguyen
(74) *Attorney, Agent, or Firm* — Dinsmore & Shohl LLP; Yongsok Choi, Esq.

(57) ABSTRACT

Provided are a method and apparatus for proposing a solution, based on a survey. The method includes storing indicators in a data format in a database, wherein each of the indicators is transformed from a pattern of responses of respondents related to an issue, transforming a response of a user to the survey to a patterned response, the patterned response in the data format, selecting an indicator to be compared with the patterned response among the indicators, the indicators and the patterned response are being in the same data format, determining one or more issues, based on a comparison of the patterned response and the selected indicator, determining a proposal solution set, based on the one or more issues, and displaying the one or more issues and the proposal solution set on a device of the user.

7 Claims, 9 Drawing Sheets

(56) References Cited

U.S. PATENT DOCUMENTS

| | | | | |
|---|---|---|---|---|
| 2012/0059819 | A1* | 3/2012 | Wheeler | G06F 16/9538 |
| | | | | 707/E17.084 |
| 2013/0198800 | A1* | 8/2013 | Bezilla | H04L 43/0876 |
| | | | | 726/1 |
| 2014/0082033 | A1* | 3/2014 | Meriwether | G06F 16/182 |
| | | | | 707/827 |
| 2021/0225468 | A1* | 7/2021 | Saliman | G16H 50/30 |
| 2022/0138208 | A1* | 5/2022 | Marinucci | G06F 16/248 |
| | | | | 707/723 |
| 2023/0141807 | A1* | 5/2023 | Groenewegen | G06F 8/33 |
| | | | | 717/106 |
| 2023/0368758 | A1* | 11/2023 | Kincaid, IV | G10H 1/0025 |
| 2024/0362242 | A1* | 10/2024 | Lim | G06F 16/258 |
| 2025/0210204 | A1* | 6/2025 | Edwards | G06N 5/02 |
| 2025/0239347 | A1* | 7/2025 | Lim | A61B 5/7264 |

FOREIGN PATENT DOCUMENTS

| | | | |
|---|---|---|---|
| KR | 1020200054483 | A | 5/2020 |
| KR | 1020200094698 | A | 8/2020 |
| KR | 1020210079001 | A | 6/2021 |
| KR | 1020220071327 | A | 5/2022 |
| KR | 102451631 | B1 | 10/2022 |
| KR | 1020230021890 | A | 2/2023 |
| KR | 10-2023-0036944 | A | 3/2023 |

OTHER PUBLICATIONS

Physician Response Rates to Mail and Personal Interview Surveys (Year: 1979).*
International Search Report for PCT/KR2024/005300 issued Aug. 5, 2024.

* cited by examiner

FIG. 1A

Prior Art

METHOD OF PROPOSING SOLUTION, BASED ON SURVEY

CROSS-REFERENCE TO RELATED APPLICATION

This application is based on and claims priority under 35 U.S.C. § 119 to Korean Patent Application No. 10-2023-0054136, filed on Apr. 25, 2023, in the Korean Intellectual Property Office, the disclosure of which is incorporated by reference herein in its entirety.

BACKGROUND

1. Field

The disclosure relates to a method and apparatus for proposing a solution, based on a survey.

2. Description of the Related Art

For a customer to derive a problem or question and receive a solution or advice related thereto, a method of receiving a survey and submitting a response to the survey is commonly used in various fields through various media.

In particular, in medical fields, a method of providing a survey including multiple questions is widely used for self-diagnosis or to predict a condition of a patient, before the patient receives a full-scale treatment.

However, a survey-based prediction algorithm of the prior art is based on a tree structure or through scoring of responses to questions, and thus there is a limit that prediction is inaccurate because it is difficult to reflect numerous variables while coming to a conclusion.

SUMMARY

Provided are a method and apparatus for proposing a solution, based on a survey.

Additional aspects will be set forth in part in the description which follows and, in part, will be apparent from the description, or may be learned by practice of the presented embodiments of the disclosure.

According to an aspect of an embodiment, a method of proposing a solution, based on a survey, includes: patterning a response to the survey; determining one or more issues, based on the patterned response; and determining a proposal solution set, based on the one or more issues.

According to an aspect of another embodiment, an apparatus for proposing a solution, based on a survey, includes: a memory storing at least one program; and a processor configured to operate by executing the at least one program, to: pattern a response to the survey; determine one or more issues, based on the patterned response; and determine a proposal solution set, based on the one or more issues.

According to an aspect of another embodiment, a computer-readable recording medium has recorded thereon a program for executing the method above on a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Advantages and features of the disclosure and methods of accomplishing the same may be understood more readily by reference to the following detailed description of the embodiments and the accompanying drawings. However, it should be understood that the disclosure is not limited to the embodiments presented below, but may be implemented in various different forms, and include all transformations, equivalents, and substitutes included in the scope of the disclosure. The embodiments presented below are provided to complete the disclosure and to fully inform one of ordinary skill in the art of the scope of the disclosure. In the description of the disclosure, certain detailed explanations of related art are omitted when it is deemed that they may unnecessarily obscure the essence of the disclosure.

As used herein, the term "and/or" includes any and all combinations of one or more of the associated listed items. Expressions such as "at least one of," when preceding a list of elements, modify the entire list of elements and do not modify the individual elements of the list.

Also, the terms used in the present specification are only used to describe specific embodiments, and are not intended to limit the disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

In the disclosure, a survey may denote a set of one or more questions, configured to be provided to a respondent and enabling the respondent to submit a response. For example, when a field to which a method and apparatus of the disclosure are applied is a medical field, a survey may include questions configured such that information required to predict an illness, such as a type of symptom, a time when the symptom occurred, etc., may be submitted as responses. For example, a patient may submit a response through a survey and be proposed information about an expected illness and a medical department (medical subject) for treating the expected illness. In some embodiments, the apparatus of the patient may automatically contact the database of a hospital, and schedule an appointment for the patient. The apparatus may obtain the current location of the apparatus using a GPS and search for hospitals within a certain distance of the location of the apparatus.

In the disclosure, a respondent may denote a person who is to receive information about a solution by a method and apparatus of the disclosure for proposing a solution, based on a survey, and the respondent may submit a response to each of one or more questions included in the survey. For example, the respondent may be a patient who visited a hospital. The method of the disclosure of proposing a solution, based on a survey, may determine an issue and a solution corresponding to the issue, based on a response submitted by a respondent.

In the disclosure, an issue is a matter derived as a result of analyzing a response of a respondent, and may denote a problem associated with the respondent (or a matter in question by the respondent). In other words, the issue may correspond to a result of diagnosing a phenomenon through a survey. Accordingly, the survey is designed to collect bases for deriving the issue. For example, the issue may be related to an illness. In the disclosure, one or more issues may be derived by analyzing the response of the respondent.

In the disclosure, a solution may refer to a method for resolving a derived issue. For example, when the issue is related to an illness, the solution may be related to a medical department. For example, when the derived issue is Sjogren's syndrome, the solution may include a division of rheumatology. In the disclosure, a respondent may be proposed the solution, and perform a procedure for resolving the issue later. There may be one or more solutions for one issue.

The method of the disclosure of proposing a solution, based on a survey, may be applied not only to a field for predicting an illness, based on a response to a survey, and proposing a medical department corresponding to the illness, but also to various fields for deriving an issue and proposing a solution.

Figure 1A:
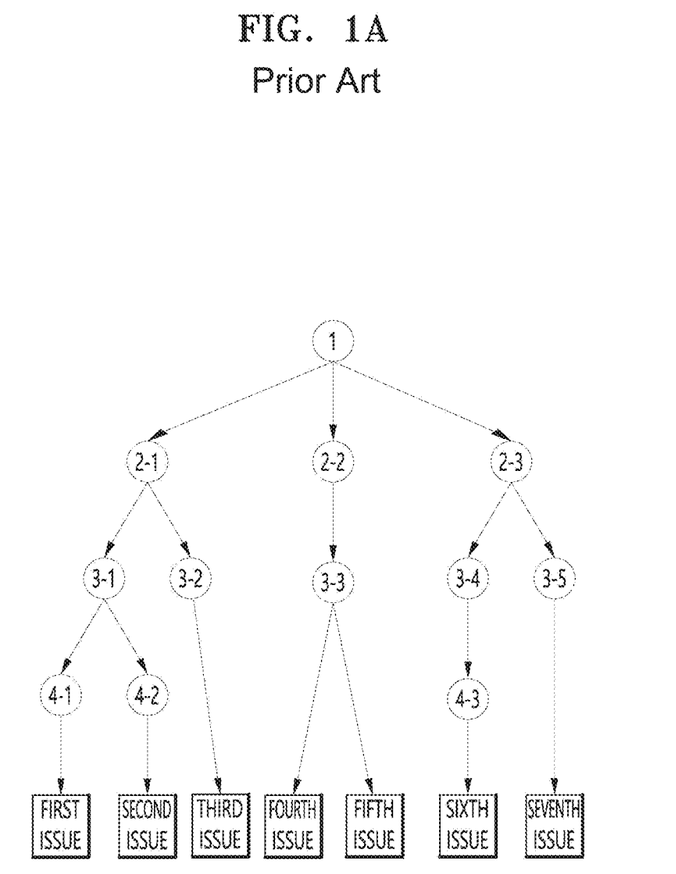
FIGS. 1A and 1B are diagrams for describing a method of deriving an issue, based on a survey, according to the prior art.
Figure 1B:
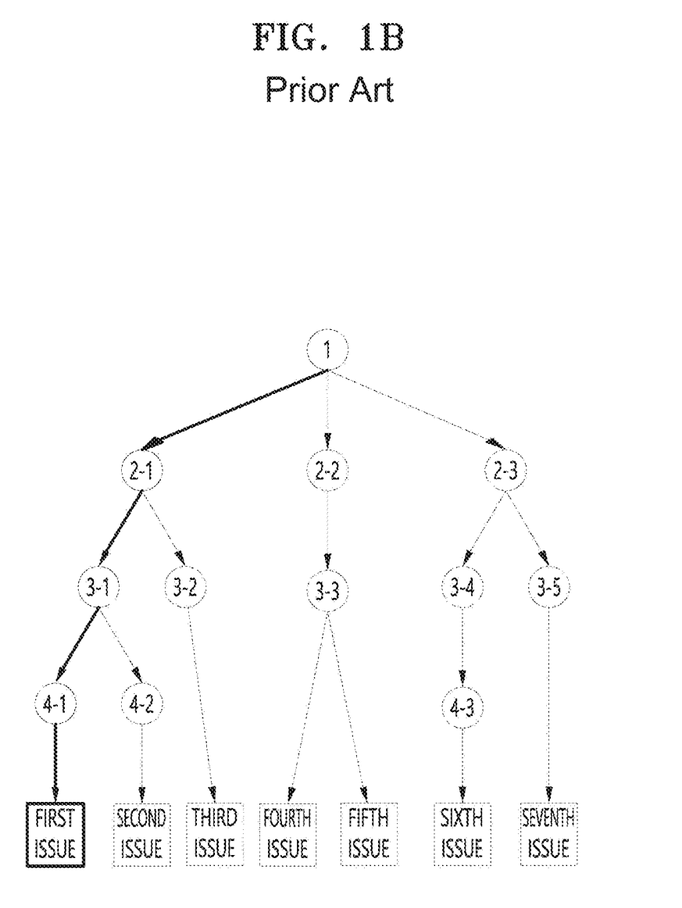

FIGS. 1A and 1B are diagrams for describing a method of deriving an issue, based on a survey, according to the prior art.

Referring to FIGS. 1A and 1B, an algorithm of a method of deriving an issue through one or more questions is shown in a tree structure. The method according to FIGS. 1A and 1B may be a method based on a so-called decision tree.

In FIGS. 1A and 1B, a node in a circle shape including a number may correspond to any one of the one or more questions included in the survey. In FIGS. 1A and 1B, the numbers in the nodes, such as 1, 2-1, and 2-2, are numbers assigned for convenience.

According to the method of the prior art, a respondent may submit responses sequentially for the one or more questions provided to the respondent. The provided question may be dependent on the response of the respondent. In other words, the question to be provided to the respondent may vary according to the response of the respondent. When the respondent responds to the question, the respondent may receive a next question or an issue may be determined.

In FIGS. 1A and 1B, a connection from a first node to a second node may denote that when the respondent submits a response to a question corresponding to the first node, the respondent may receive a question corresponding to the second node. For example, a node 2-1 is connected to a node 3-1 and a node 3-2, and thus depending on a response submitted by the respondent for a question corresponding to the node 2-1, the respondent may then receive a question corresponding to the node 3-1 or a question corresponding to the node 3-2. For example, when the respondent submits a response designed to be connected to the question corresponding to the node 3-1 for the question corresponding to the node 2-1, the respondent may receive the question corresponding to the node 3-1.

In FIGS. 1A and 1B, a connection from one node to an issue may denote that when the respondent submits a response to a question corresponding to the node, the issue is derived. For example, a first issue may be derived as the issue, based on a response submitted by the respondent for a question corresponding to a node 4-1.

In detail, referring to FIG. 1B, the respondent may initially submit a response to a question corresponding to a node 1. In the example of FIG. 1B, a question corresponding to a node 2-1 may be additionally provided to the respondent, based on a response submitted by the respondent for the question corresponding to the node 1. Similarly, the respondent may submit a response to the question corresponding to the node 2-1. In the example of FIG. 1B, a question corresponding to a node 3-1 may be additionally provided to the respondent, based on the response submitted by the respondent for the question corresponding to the node 2-1. Similarly, the respondent may submit a response to the question corresponding to the node 3-1. In the example of FIG. 1B, a question corresponding to a node 4-1 may be additionally provided to the respondent, based on the response submitted by the respondent for the question corresponding to the node 3-1. In the example of FIG. 1B, a first issue may be derived as an issue, based on a response submitted by the respondent for the question corresponding to the node 4-1.

As shown in the example of FIG. 1B, a process of deriving an issue, based on a survey, according to the prior art, is based on a standardized method and is simple. According to the example of FIG. 1B, fourth through seventh issues are completely eliminated by one response submitted for the question corresponding to the node 1 that is a first question of the survey. Accordingly, the survey of the prior art is able to derive an accurate issue only for a situation considered to be common or representative. For example, when an issue is an illness, symptoms may not be the same for all people even when they have a same illness, and thus the survey of the prior art shown in FIGS. 1A and 1B does not reflect diversity and thus may be inaccurate.

Meanwhile, the respondent may receive a solution for an issue derived based on the survey of the method described with reference to FIGS. 1A and 1B, but a method of determining the solution, according to the prior art, also includes a limitation.

Figure 2:
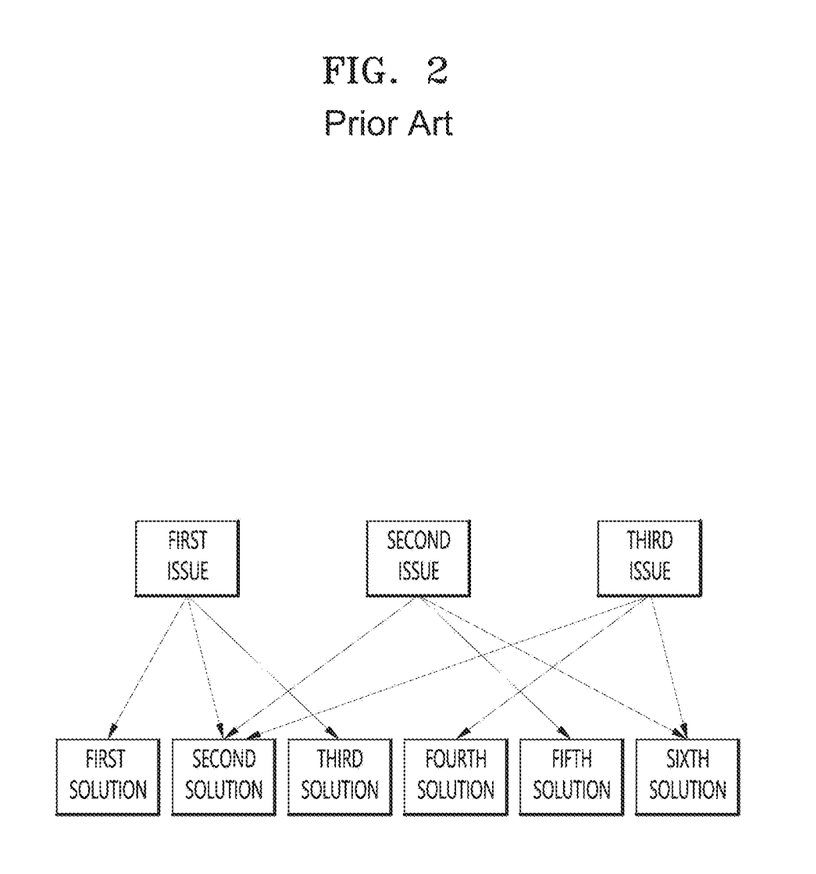
FIG. 2 is a diagram for describing a method of determining a solution, based on an issue, according to the prior art.

FIG. 2 is a diagram for describing a method of determining a solution, based on an issue, according to the prior art.

Referring to FIG. 2, one issue is connected to one or more solutions. There may be one or more solutions for one issue, and thus relationships between issues and solutions may be shown as FIG. 2. For example, when an issue is an illness and a third issue is osteoporosis, orthopedics, endocrinology, or the like may perform medical treatment on osteoporosis, and thus a fourth solution may be orthopedics and a sixth solution may be endocrinology.

The method of determining a solution, according to the prior art immediately determines a solution according to a determined issue, based on a simple matching relationship, and the solution determined as such may not be directly associated with a response submitted by a respondent for a question. According to such a method, a solution corresponding to an issue that is not determined as a derived issue may be completely eliminated, and it may be unable to derive a more effective solution, considering a relationship with another issue. For example, when a third issue was derived as an issue, based on a survey of the prior art, and a second solution, a fourth solution, and a sixth solution were provided to a respondent as possible solutions, but the respondent selects the fourth solution for some reason, the second solution may not be selected despite that the second solution may be an effective choice in that the second solution handles all of a first issue, a second issue, and the third issue.

Hereinafter, a method of deriving an issue and proposing a solution, based on a survey, according to various embodiments of the disclosure, the method being differentiated from the method of the prior art, will be described.

The method of proposing a solution, based on a survey, according to various embodiments described below may be performed by an apparatus for proposing a solution, based on a survey, of the disclosure, in particular, by a processor included in the apparatus.

Hereinafter, units according to various embodiments (for example, a response processor 310, an issue determiner 320, and a solution determiner 330) are illustrated and described as if they are isolated for convenience of description about performed operations, but the units are not necessarily isolated, and one or more different units may be implemented in one apparatus unit.

Figure 3:
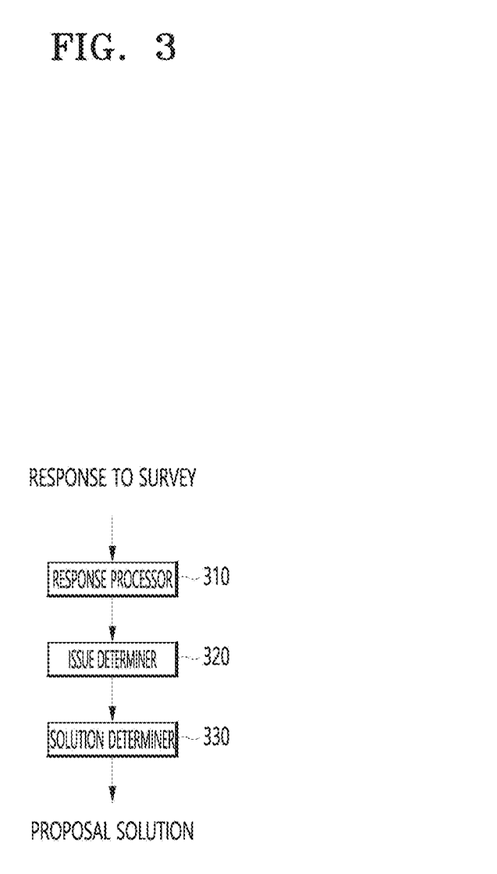
FIG. 3 is a flowchart of operations of an apparatus for proposing a solution, based on a survey, according to an embodiment of the disclosure.

FIG. 3 is a flowchart of operations of an apparatus for proposing a solution, based on a survey, according to an embodiment of the disclosure.

In the disclosure, a response to a survey, submitted by a respondent, may be input to the response processor 310. In the disclosure, the response processor 310 may process the input response to the survey and output data to the issue determiner 320. In the disclosure, the issue determiner 320 may determine an issue, based on the data input from the response processor 310, and output data to the solution determiner 330. In the disclosure, the solution determiner 330 may determine a solution, based on the data input from the issue determiner 320, and output a proposal solution. The issue or the proposal solution may be displayed on a device of the user (the respondent). Hereinafter, operations of each of the response processor 310, the issue determiner 320, and the solution determiner 330 will be described in detail.

Figure 4:
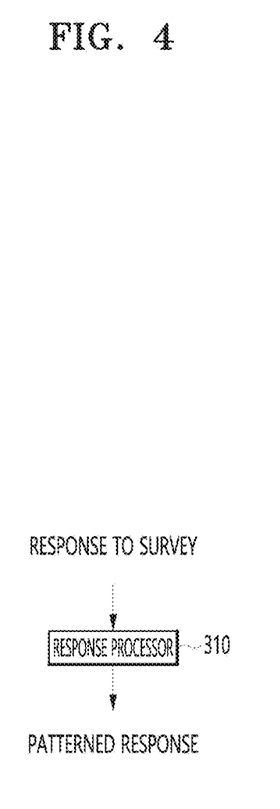
FIG. 4 is a flowchart of operations of a response processor, according to an embodiment of the disclosure.

FIG. 4 is a flowchart of operations of the response processor, according to an embodiment of the disclosure.

As described above, in the disclosure, the response processor 310 may process the input response to the survey and output the data to the issue determiner 320. In detail, referring to FIG. 4, the response processor 310 may pattern the response to the survey, and generate and output a patterned response. The response processor 310 may transform the response of a user to the survey to a patterned response in the data format that is the same as the data format of indicators.

In the disclosure, the survey may include one or more questions, and responses to the one or more questions may be patterned by the response processor 310, instead of being scored in response to the questions or determining a next question, as in the method of the prior art described above.

Figure 5:
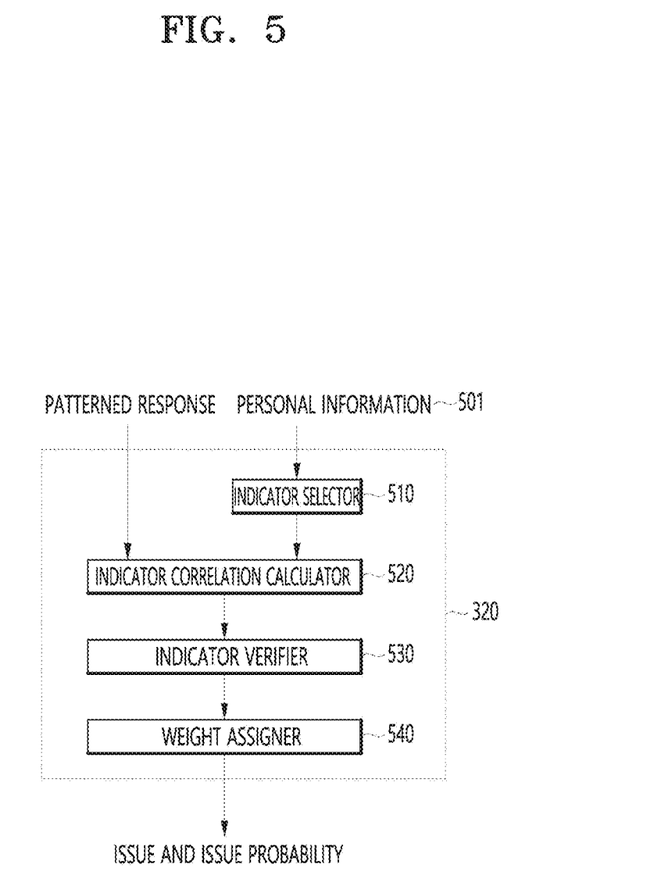
FIG. 5 is a flowchart of operations of an issue determiner, according to an embodiment of the disclosure.

FIG. 5 is a flowchart of operations of the issue determiner, according to an embodiment of the disclosure.

As described above, in the disclosure, the issue determiner 320 may determine the issue, based on the data input from the response processor 310, and output the data to the solution determiner 330. In detail, referring to FIG. 5, the issue determiner 320 may generate and output the issue and an issue probability, based on the patterned response.

According to an embodiment, the issue determiner 320 may include an indicator selector 510.

According to an embodiment, the indicator selector 510 may select an indicator. The indicator may be used to calculate an indicator correlation by being compared with the patterned response. In the disclosure, the indicator correlation may refer to a correlation between the patterned response and the indicator.

According to an embodiment, the indicator may be selected based on personal information 501. In other words, the indicator selector 510 may select the indicator, based on the personal information 501. The personal information 501 denotes personal information about the respondent, and according to an embodiment, the issue determiner 320 (or the apparatus for proposing a solution, based on a survey) may receive the personal information 501, and the personal information 501 may be based on information of the respondent, which is input by the respondent or pre-collected. For example, the personal information 501 may be information capable of indicating an age, sex, height, and weight of the respondent in objective figures.

In the disclosure, the indicator may be data configured to detect a pattern of responses to the survey. Accordingly, the patterned response and the indicator may have a same data format. Because the patterned response and indicators are in the same data format, the speed of processing the patterned response and the indicators (e.g., comparing the patterned response and one of the indicators) may be increased. In the disclosure, one or more indicators corresponding to a series of survey may be pre-generated, and the generated one or more indicators may be stored in a database. The indicator may be stored in the database in a predetermined data format. The indicator selector 510 may select one of the one or more indicators stored in the database, and the selecting of the indicator may be based on the personal information 501.

In the disclosure, the indicator may reflect an associative relationship with one or more issues. In other words, the indicator may be pre-generated by transforming, into data in a predetermined data format, a pattern of responses provided by respondents related to a specific issue. For example, patients having a specific illness may have similar symptoms or have similar conditions, and thus the indicator may be generated by reflecting characteristics of the patients. As will be described later, the indicator correlation is calculated based on the patterned response and the selected indicator, and when the indicator correlation is high, the selected indicator and the pattern of responses are similar, and thus one or more issues included in the indicator have a high association with the response of the respondent.

According to an embodiment, the issue determiner 320 may include an indicator correlation calculator 520.

According to an embodiment, the indicator correlation calculator 520 may calculate the indicator correlation, based on the patterned response and the selected indicator. The indicator correlation may be a figure indicating a degree of similarity between the patterned response and the selected indicator. The indicator correlation calculator 520 may calculate the indicator correlation through any suitable method. For example, the indicator correlation calculator 520 may calculate the indicator correlation by using any one of various correlation analyses used in probability theory, statistics, and the like.

According to an embodiment, the issue determiner 320 may select one or more indicators and calculate the indicator correlation corresponding to each of the selected one or more indicators. In other words, operations of the indicator selector 510 and indicator correlation calculator 520 may be repeatedly performed a plurality of times.

According to an embodiment, the issue determiner 320 may further include an indicator verifier 530.

According to an embodiment, the indicator verifier 530 may determine whether to discard the indicator, based on the patterned response and the indicator. In other words, the indicator verifier 530 may verify whether the indicator selected by the indicator selector 510 is an indicator suitable to the patterned response. Because the indicator correlation calculator 520 only calculates the indicator correlation between the patterned response and the indicator, it is unable to verify whether the indicator selected by the indicator selector 510 is suitable, and thus the indicator verifier 530 may verify whether the indicator is suitable.

According to an embodiment, the indicator may further include a screener. In the disclosure, the screener may refer to data for identifying whether the patterned response is not at all related to a specific issue.

According to an embodiment, the indicator may be configured to include the screener. The indicator verifier 530 may verify the indicator, based on the screener. For example, when an issue is related to an illness, a person with a first illness always has a first symptom, and when a respondent responds to a question associated with the first symptom included in a survey that the first symptom is "not at all" shown, it may be reasonable not to consider a corresponding issue, and in this regard, an indicator verification process of the disclosure may be performed.

In detail, when the patterned response is identified by the screener, the indicator verifier 530 may discard the indicator. The indicator verifier 530 may verify the indicator, based on the patterned response and the screener. When the verification is not successful, the indicator verifier 530 may discard the indicator that has not passed the verification. The discarding of the indicator may indicate that, during a process of proposing a solution, based on a survey, according to the disclosure, it is determined not to use the indicator selected by the indicator selector 510 any longer.

As described above, one or more indicator correlation may be calculated in response to one or more indicators, and thus a process of verifying an indicator may also be performed for each of the one or more indicators.

According to an embodiment, the indicator verifier 530 may verify the indicator by calculating a verification coefficient that is a correlation between the patterned response and the screener. An example of calculating the verification coefficient may be represented by Equation 1 below.

$$x'_n = x_n \times a_n \qquad \text{[Equation 1]}$$

In Equation 1, $x_n$ may denote an $n^{th}$ indicator correlation from among indicator correlations calculated by the indicator correlation calculator 520. In other words, $x_1$, $x_2$, $x_3$, and so on may be indicator correlations calculated based on the patterned response and the selected indicators. In Equation 1, $x'_n$ may denote an $n^{th}$ indicator correlation after indicator verification is performed on $x_n$.

In Equation 1, $a_n$ may be an $n^{th}$ verification coefficient corresponding to the $n^{th}$ indicator correlation (or an $n^{th}$ indicator) from among verification coefficients calculated by the indicator verifier 530. According to an embodiment, the indicator verifier 530 may calculate the verification coefficient, based on the patterned response and the screener. In other words, $a_1$, $a_2$, $a_3$, and so on may be verification coefficients calculated based on the patterned response and the screeners corresponding to the selected indicators.

According to an embodiment, the verification coefficient or $a_n$ may be 0 or 1. When the verification coefficient is 0, a corresponding indicator is discarded, and when the verification coefficient is 1, a corresponding indicator is not discarded. For example, when the indicator correlation calculated based on a second selected indicator is $x_2$, and the verification coefficient calculated based on a screener corresponding to the second selected indicator is $a_2$ having a value of 0, $x'_2$ is 0, and thus the second selected indicator may be discarded because the indicator correlation calculated based on the second selected indicator is not considered in subsequent processes.

According to an embodiment, the issue determiner 320 may include a weight assigner 540.

According to an embodiment, the weight assigner 540 may assign a weight to the indicator correlation. The issue determiner 320 may calculate an issue probability, based on the weight and one or more correlations respectively corresponding to one or more indicators. In the disclosure, the issue probability may refer to a probability that a corresponding issue will be an issue suitable to the respondent.

In the disclosure, the weight may be a value pre-determined in association with one or more issues. In the disclosure, by introducing the weight, the issue is determined based on the response submitted by the respondent, while a possibility that each issue may occur, importance of each issue, and a value of each issue may also be reflected. For example, when an issue is related to an illness, and when a probability that a respondent may have a first illness is greater than a probability that the respondent may have a second illness, only depending on responses submitted by the respondent, but a probability that the first illness will develop is extremely low, it may be more reasonable to determine the second illness as the issue. When the issue is related to an illness, the weight may be pre-determined according to clinical importance of each illness, a probability of occurrence of each illness, and the like. Thus, according to an embodiment, the weight may vary depending on an issue. Also, according to an embodiment, the weight may be pre-determined by being matched with the indicator.

According to an embodiment, the weight may vary depending on a respondent. For example, a weight most suitable to the respondent may be selected from among pre-determined weights.

According to an embodiment, the weight assigner 540 may calculate the issue and issue probability by assigning the weight to the indicator correlation.

According to an embodiment, the weight assigner 540 may assign the weight to each of one or more indicator correlations calculated in response to the one or more indicators. An example of the weight assigner 540 assigning the weight may be represented by Equation 2 below.

$$\begin{bmatrix} y_1 \\ y_2 \\ y_3 \\ \cdots \\ y_m \end{bmatrix} = \begin{bmatrix} w_{11} & w_{12} & w_{13} & \cdots & w_{1n} \\ w_{21} & w_{22} & w_{23} & \cdots & w_{2n} \\ w_{31} & w_{32} & w_{33} & \cdots & w_{3n} \\ \cdots & & & & \\ w_{m1} & w_{m2} & w_{m3} & \cdots & w_{mn} \end{bmatrix} \times \begin{bmatrix} x_1 \\ x_2 \\ x_3 \\ \cdots \\ x_n \end{bmatrix} \quad \text{[Equation 2]}$$

In Equation 2, $y_m$ may be an issue probability of an $m^{th}$ issue from among one or more issues. In other words, $y_m$ may be a probability of the $m^{th}$ issue, which is calculated by assigning, by the weight assigner 540, a weight to an indicator correlation.

In Equation 2, $w_{mn}$ may be associated with the $m^{th}$ issue and denote a weight for an $n^{th}$ indicator.

In Equation 2, $x_1$, $x_2$, $x_3$, and so on may indicate indicator correlations described above. $x_1$, $x_2$, $x_3$, and so on may indicate indicator correlations after indicator verification is performed, i.e., $x'_1$, $x'_2$, $x'_3$, and so on.

According to Equation 2, the issue probabilities for one or more issues may be calculated by multiplying the weight by the calculated indicator correlations.

As described above, the weight assigner 540 may determine one or more issues by assigning the weight to each of the one or more indicator correlations, and calculate the issue probability for each of the one or more issues.

According to an embodiment, the issue determiner 320 may select some of the determined one or more issues. For example, an issue in which an issue probability is equal to or less than a threshold value may be discarded.

According to an embodiment, the process of FIG. 5 of calculating the issue and issue probability, based on the patterned response, may be performed based on an artificial intelligence (AI) model. According to an embodiment, the AI model may be trained to receive a patterned response and output one or more indicators having highest similarity to the patterned response from among pre-generated indicators. The AI model may include, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning.

Figure 6:
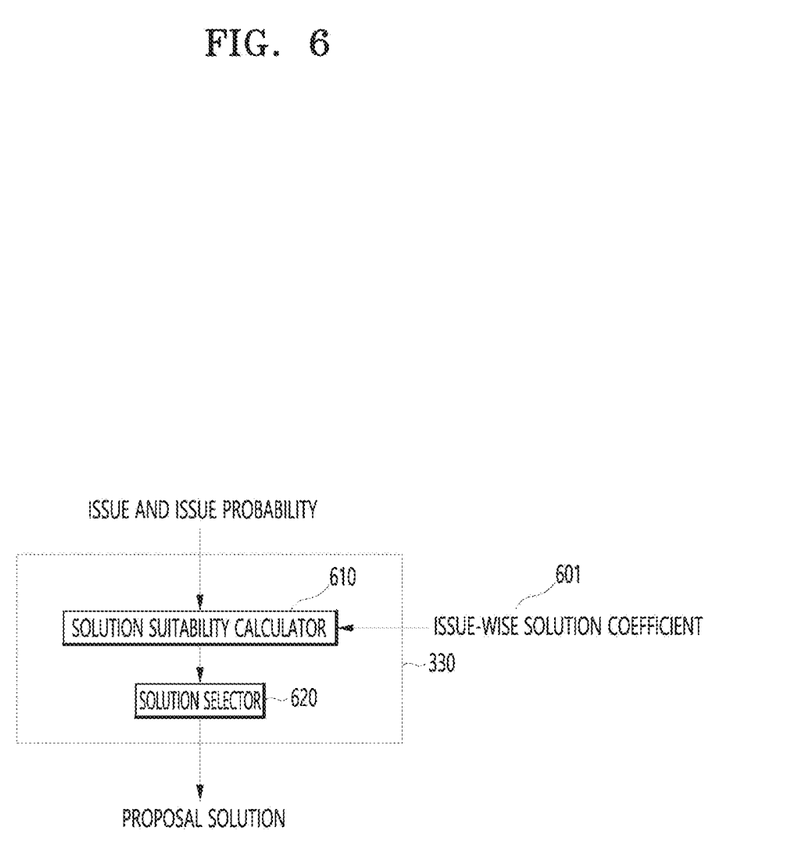
FIG. 6 is a flowchart of operations of a solution determiner, according to an embodiment of the disclosure.

FIG. 6 is a flowchart of operations of the solution determiner, according to an embodiment of the disclosure.

As described above, in the disclosure, the solution determiner 330 may determine the solution, based on the data input from the issue determiner 320, and output the proposal solution. In detail, the solution determiner 330 may determine the proposal solution, based on the one or more issues and the proposal solution for each of the one or more issues.

According to an embodiment, the solution determiner 330 may include a solution suitability calculator 610.

According to an embodiment, the solution suitability calculator 610 may calculate solution suitability for a solution, based on the received issue and issue probability, and an issue-wise solution coefficient 601. In the disclosure, the issue-wise solution coefficient 601 may be a pre-determined value indicating a correlation between each of one or more issues and each of one or more proposal solutions. In other words, correlations between one or more issues and all proposable solutions may be pre-calculated and stored. For example, when an issue is related to an illness and a solution is related to medical treatment, and when a first issue is Sjogren's syndrome, a first solution is rheumatology, and a second solution is ophthalmology, a correlation between the first issue and the first solution may be greater than a correlation between the first issue and the second solution. A specific issue and a specific solution may not be associated with each other at all, and in this case, a value of a correlation between the specific issue and the specific solution may be 0. In the disclosure, by introducing the issue-wise solution coefficient 601, a logical solution may be proposed to the respondent when one or more issues are derived.

An example of the solution suitability calculator 610 calculating the solution suitability may be represented by Equation 3 below.

$$\begin{bmatrix} s_1 \\ s_2 \\ s_3 \\ \cdots \\ s_k \end{bmatrix} = \begin{bmatrix} r_{11} & r_{12} & r_{13} & \cdots & r_{1m} \\ r_{21} & r_{22} & r_{23} & \cdots & r_{2m} \\ r_{31} & r_{32} & r_{33} & \cdots & r_{3m} \\ \cdots & & & & \\ r_{l1} & r_{l2} & r_{l3} & \cdots & r_{km} \end{bmatrix} \times \begin{bmatrix} y_1 \\ y_2 \\ y_3 \\ \cdots \\ y_m \end{bmatrix} \quad \text{[Equation 3]}$$

In Equation 3, $s_k$ denotes solution suitability calculated by the solution suitability calculator 610, and may indicate how much a $k^{th}$ solution from among one or more solutions is suitable to a response submitted by the respondent.

In Equation 3, $r_{km}$ may denote a correlation between an $m^{th}$ issue and the $k^{th}$ solution.

In Equation 3, $y_m$ may be an issue probability of the $m^{th}$ issue from among one or more issues.

According to Equation 3, solution suitability for one or more solutions may be calculated by multiplying the correlation by one or more issues.

According to an embodiment, the solution determiner 330 may include a solution selector 620.

According to an embodiment, the solution selector 620 may select the proposal solution as some of the calculated one or more solutions. According to an embodiment, the solution selector 620 may select the proposal solution, based on the solution suitability. For example, the solution selector 620 may select the proposal solution as solutions having solution suitability equal to or greater than a threshold value. According to an embodiment, the solution selector 620 may select the proposal solution as some solutions having high solution suitability.

According to an embodiment, the solution selector 620 may determine a proposal solution set, based on the selected proposal solution. According to an embodiment, the proposal solution set may include one or more proposal solutions and solution suitability for the one or more proposal solutions, and enable the respondent to choose one of the proposal solutions.

According to an embodiment, the determined one or more issues and the proposal solution may be provided to the respondent. In other words, the apparatus for proposing a solution, based on a survey, of the disclosure, may provide, to the respondent, the determined one or more issues and the proposal solution by, for example, displaying the same on a display device.

According to an embodiment, the patterned response used to determine the issue may be used as data for enhancing a performance of the apparatus. In other words, accuracy of an algorithm of the disclosure may be increased based on many samples. For example, the patterned response may be stored in a database that is a basis for selecting an indicator, through any suitable process. Alternatively, the patterned response may be used as training data for an AI model, together with a label for the patterned response. The AI model may include, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning.

Figure 7:
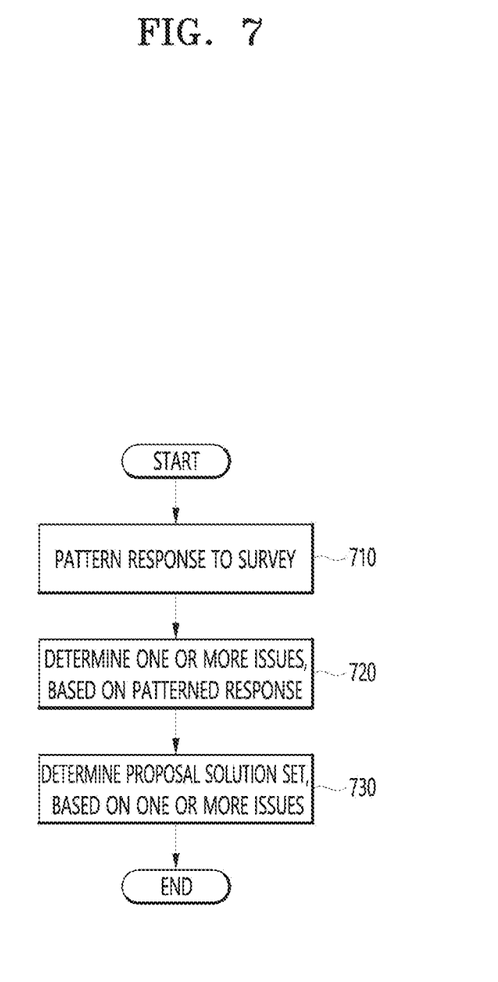
FIG. 7 is a flowchart of a method of proposing a solution, based on a survey, according to an embodiment of the disclosure.

FIG. 7 is a flowchart of a method of proposing a solution, based on a survey, according to an embodiment of the disclosure.

Operations shown in FIG. 7 may be performed by the above-described apparatus for proposing a solution, based on a survey. In detail, the operations shown in FIG. 7 may be performed by a processor included in the above-described apparatus for proposing a solution, based on a survey.

In operation 710, the apparatus may pattern a response to a survey.

In operation 720, the apparatus may determine one or more issues, based on the patterned response.

According to an embodiment, the apparatus may receive personal information, and operation 720 may include selecting an indicator to be compared with the patterned response, based on the personal information.

According to an embodiment, operation 720 may include calculating a correlation between the patterned response and the indicator.

According to an embodiment, the indicator may further include a screener.

According to an embodiment, operation 720 may include verifying the indicator, based on the patterned response and the screener.

According to an embodiment, operation 720 may include discarding the indicator when the verification is not successful.

According to an embodiment, operation 720 may include calculating an issue probability, based on a pre-determined weight and one or more correlations respectively corresponding to the one or more indicators.

In operation 730, the apparatus may determine a proposal solution set, based on one or more issues.

According to an embodiment, operation 730 may include calculating a solution suitability for one or more solutions, based on the one or more issues and a pre-determined issue-wise solution coefficient.

After operation 730, the apparatus may display the one or more issues and the proposal solution set.

Figure 8:
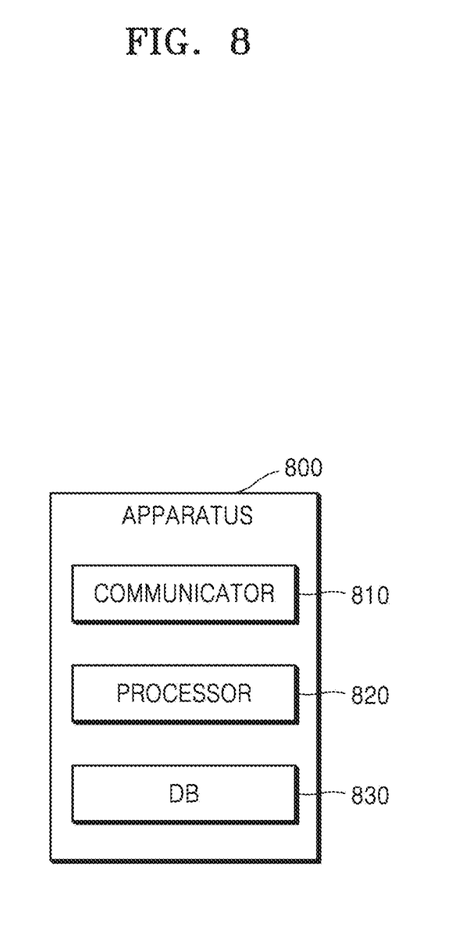
FIG. 8 is a block diagram of an apparatus for proposing a solution, based on a survey, according to an embodiment of the disclosure.

FIG. 8 is a block diagram of an apparatus for proposing a solution, based on a survey, according to an embodiment of the disclosure.

Referring to FIG. 8, the apparatus 800 may include a communicator 810, a processor 820, and a database (DB) 830. FIG. 8 illustrates only components that are related to an embodiment of the apparatus 800. Thus, it would be obvious to one of ordinary skill in the art that the apparatus 800 may further include general-purpose components other than the components shown in FIG. 8.

The communicator 810 may include one or more components enabling wired/wireless communication with an external server or an external device. For example, the communicator 810 may include at least one of a short-range wireless communication unit (not shown), a mobile communication unit (not shown), and a broadcast receiver (not shown).

The DB 830 is hardware storing various types of data processed by the apparatus 800, and may store programs for processing and control by the processor 820. The DB 830 may store payment information, user information, and the like.

The DB 830 may include a random access memory (RAM) such as a dynamic random access memory (DRAM) or a static random access memory (SRAM), a read-only memory (ROM), an electrically erasable programmable read-only memory (EEPROM), CD-ROM, Blu-ray or another optical disk storage, a hard disk drive (HDD), a solid state drive (SSD), or a flash memory.

The processor 820 controls general operations of the apparatus 800. For example, the processor 820 may execute programs stored in the DB 830 to control an input unit (not shown), a display (not shown), the communicator 810, and the DB 830, in general. The processor 820 may execute programs stored in the DB 830 to control operations of the apparatus 800.

The processor 820 may control at least some of the operations of the apparatus 800 described above with reference to FIGS. 1 through 7.

The processor 820 may be realized by using at least one of an application-specific integrated circuit (ASIC), a digital signal processor (DSP), a digital signal processing device (DSPD), a programmable logic device (PLD), a field programmable gate array (FPGA), a controller, a micro-controller, a microprocessor, and electric units for performing other functions.

According to an embodiment, the apparatus 800 may be a mobile electronic device. For example, the apparatus 800 may be implemented as a smart phone, a tablet personal computer (PC), a PC, a smart television (TV), personal digital assistant (PDA), a laptop computer, a media player, a navigation device, a device with a camera, or another mobile electronic device. Alternatively, the apparatus 800 may be implemented as a wearable device including a communication function and a data processing function, such as a watch, glasses, a hairband, or a ring.

The embodiments according to the disclosure may be implemented in a form of a computer program executable by various components on a computer, and such a computer program may be recorded in a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the disclosure or well known to one of ordinary skill in the computer software field. Examples of the computer program include not only machine codes generated by a compiler, but also high-level language codes executable by a computer by using an interpreter or the like.

According to an embodiment, a method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be at least temporarily stored or temporarily generated in the machine-readable storage medium such as a server of a manufacturer, a server of an application store, or a memory of a relay server.

Unless an order is clearly stated or unless otherwise stated, operations configuring a method according to the disclosure may be performed in an appropriate order. the disclosure is not necessarily limited by an order the operations are described. In the disclosure, the use of all examples or exemplary terms (for example, "etc.") is merely for describing the present disclosure in detail and the scope of the present disclosure is not limited by those examples or exemplary terms unless defined in the claims. Also, it would be obvious to one of ordinary skill in the art that various modifications, combinations, and changes may be configured according to design conditions and factors within the scope of claims or equivalents.

According to various embodiments of the disclosure, an accurate issue may be derived based on a survey and a reasonable solution may be provided based on the derived issue.

Also, an algorithm according to various embodiments of the disclosure may have improved accuracy and continuously develop because samples become massive as data is collected and prediction is performed based on the samples.

In addition, the algorithm according to various embodiments of the disclosure is applicable not only to medical fields but also to various fields, and thus has high applicability.

In addition, the algorithm according to various embodiments of the disclosure is not limited to fields performing prediction based on responses to a survey, but is also applicable to other fields of performing prediction based on certain data, and thus has high applicability.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of proposing a solution, based on a survey, comprising:
   storing indicators in a data format in a database, wherein each of the indicators is transformed from a pattern of responses of respondents associated with an issue and is configured to detect a pattern of responses to the survey;
   receiving personal information of a user and transforming a response of the user to the survey to a patterned response, wherein the patterned response is in the data format;
   selecting an indicator to be compared with the patterned response among the indicators based on the personal information, wherein the indicators and the patterned response are in the same data format;
   determining one or more issues, based on a comparison of the patterned response and the selected indicator;
   determining a proposal solution set, based on the one or more issues; and
   displaying the one or more issues and the proposal solution set on a device of the user, and
   wherein the determining of the one or more issues further comprises calculating a correlation between the patterned response and the indicator.

2. The method of claim 1, further comprising displaying probabilities of the one or more issues on the device of the user.

3. The method of claim 1, wherein
   the indicator comprises a screener, and
   the determining of the one or more issues comprises:
      verifying the indicator, based on the patterned response and the screener; and
      discarding the indicator when the verification is not successful.

4. The method of claim 1, wherein the determining of the one or more issues further comprises calculating an issue probability, based on a pre-determined weight and one or more correlations respectively corresponding to one or more indicators.

5. The method of claim 1, wherein the determining of the proposal solution set comprises calculating a solution suitability for one or more solutions, based on the one or more issues and a pre-determined issue-wise solution coefficient.

6. A non-transitory computer-readable recording medium having recorded thereon a program for executing the method of claim 1 on a computer.

7. An apparatus for proposing a solution, based on a survey, comprising:
   a memory storing at least one program; and
   a processor configured to operate by executing the at least one program, to:
      store indicators in a data format in a database, wherein each of the indicators is transformed from a pattern of responses of respondents associated with an issue and is configured to detect a pattern of responses to the survey;
      receive personal information of a user and transform a response of the user to the survey to a patterned response, wherein the patterned response is in the data format;
      select an indicator to be compared with the patterned response among the indicators based on the personal information, wherein the indicators and the patterned response are in the same data format;
      determine one or more issues, based on the patterned response;
      determine a proposal solution set, based on the one or more issues; and
      display the one or more issues and the proposal solution set on a device of the user, and
      wherein the determining of the one or more issues further comprises calculating a correlation between the patterned response and the indicator.

* * * * *